May 6, 1947.

T. A. RICH 2,420,193

VOLTAGE RATIO RECORDER

Filed Dec. 24, 1943

Inventor:
Theodore A. Rich,
by Harry E. Dunham
His Attorney.

Patented May 6, 1947

2,420,193

UNITED STATES PATENT OFFICE 2,420,193

VOLTAGE RATIO RECORDER

Theodore A. Rich, Schenectady, N. Y., assignor to General Electric Company, a corporation of New York Application December 24, 1943, Serial No. 515,509

5 Claims. (Cl. 234—1.5)

My invention relates to a method and apparatus for measuring voltage ratios and the relative polarity of the two voltages involved and producing immediately available records of such measurements. The method employed assumes that the voltages to be investigated are alternating voltages of the same frequency and have an interdependent phase relation which is either in phase or 180 degrees out of phase; and involves the steps of shifting the phase of one voltage 90 degrees relative to the other and recording the phase position of the vector summation thereof.

The invention is useful in special applications where conventional measuring methods are unsuitable, and the application which will be explained by way of an example is that of indicating the degree of accuracy with which a turret gun follows the movement of a gunfire control directing system.

Figure 1:
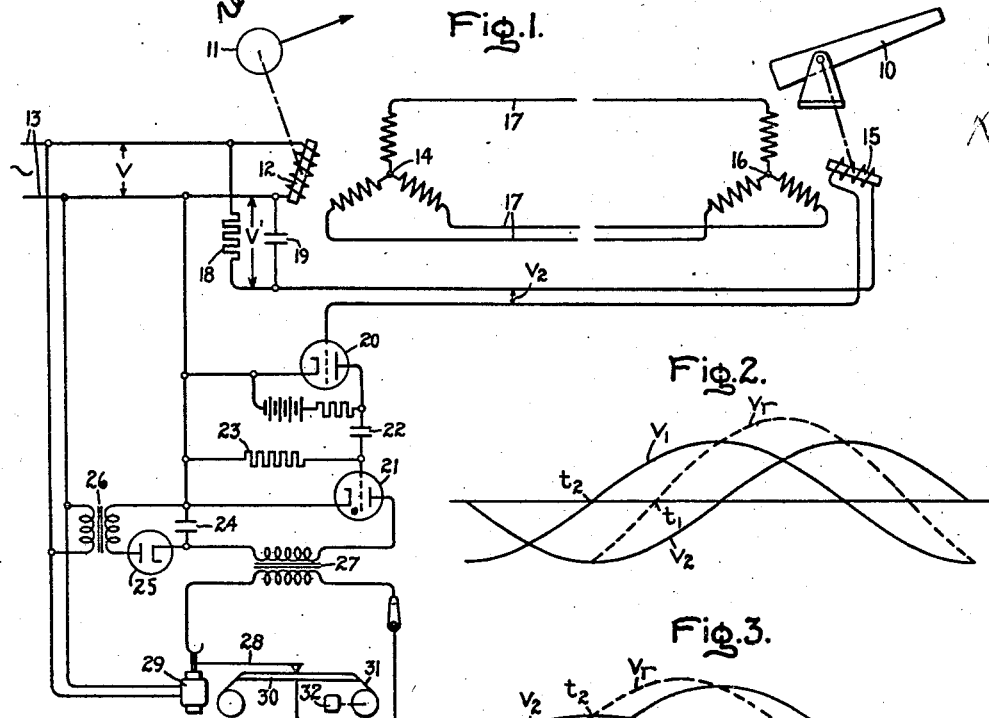
Figure 2:
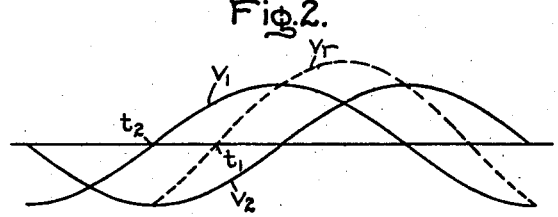
Figure 3:
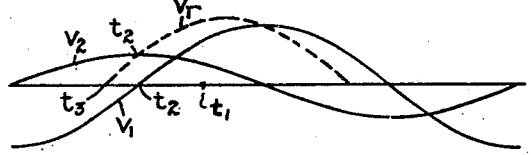
Figure 4:
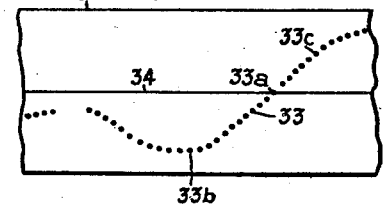
Figure 5:
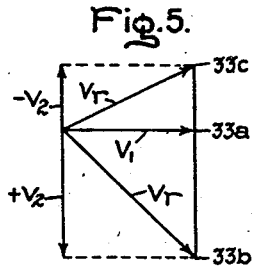
Figure 6:
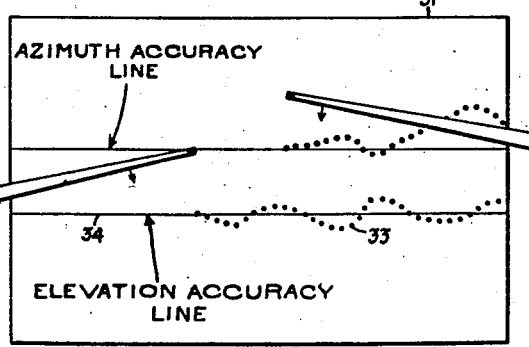

The features of the invention which are believed to be novel and patentable will be pointed out in the claims appended hereto. For a better understanding of my invention, reference is made in the following description to the accompanying drawing in which Fig. 1 represents apparatus for carrying out my invention for producing a record which shows the degree of integrity of an alternating current position signaling system; Figs. 2 and 3 show cyclic voltage relation curves explanatory of my invention; Fig. 4 shows the form of record obtained; Fig. 5 is an explanatory vector diagram; and Fig. 6 represents a multiple recorder.

In Fig. 1 of the drawing let it be assumed that 10 represents a large gun, the elevation and azimuth direction movements of which are operated by machinery, not shown, and such machinery is controlled either automatically or manually from elevation and azimuth directing motion transmission receivers of a gunfire control system. Let device 11 represent the receiver for directing the gun elevation control. My invention is here represented as used to record the degree of accuracy with which the gun elevation follows the elevation directing movement of receiver 11. It is to be understood that the gun 10 and elevation directing device 11 are diagrammatically represented and that the nature of the device 11, the manner of control of the gun 10, and mechanism for such control are immaterial.

Connected to the movable element of receiver 11 is the rotor 12 of a conventional form of alternating current motion transmitter of such size as to be operated with receiver 11 without imposing any erroneous load on such receiver 11. The rotor 12 has a winding excited from an alternating current source 13, and the transmitter has a three-phase stator winding 14 into which currents are induced and which have a distribution dependent upon the position of rotor 12. Connected so as to be rotated, when the gun 10 is elevated or depressed, is a rotor having a winding 15 cooperating with a three-phase stator 16. The device comprising the rotor 15 and stator 16 is essentially similar to the transmitter just described and could be used with such transmitter as the receiver of a motion transmission system, but is not so used here. The stator windings 14 and 16 are connected together by leads 17, either directly or through intermediate apparatus that does not interfere with the present invention. It is noted that rotor 15 has a rotary position 90 degrees from the rotary position of rotor 12 relative to their stators. The arrangement is such that if the gun 10 correctly follows the movement of elevating directing instrument 11, rotor 15 will always have this 90-degree relation with respect to rotor 12. In such relative rotary positions the currents which flow in stator winding 16 from winding 14 induce no voltage into winding 15, and the voltage across winding 15 designated $V_2$ is zero. However if the gun is not in the correct position as indicated by instrument 11, a voltage will be induced into winding 15. This voltage will be in phase with the voltage across winding 12, or 180 degrees out of phase, depending upon which way rotor 15 is displaced from the correct position; and this voltage will be proportional to the displacement of rotor 15 from the correct 90 degree position and of the same frequency as that of source 13. The device 15—16, which may be called a correction instrument as here used, acts simply as an induction voltage regulator, the voltage of which is zero when in the 90-degree relation described.

It is now seen that when the voltage $V_2$ across winding 15 is zero, gun 10 is in the correct position called for by director instrument 11, and that if $V_2$ is not zero, the ratio $V/V_2$ represents the error; and the inphase or 180-degree out-of-phase relation of voltages $V$ and $V_2$ indicates the direction of the error in the angular position of gun 10. Now the voltage $V_2$ varies from zero upward and we are interested in the measurement of the ratio of $V/V_2$, when $V_2$ is very small and $V/V_2$ is very large, in order to detect errors in gun angle of the order of a degree or less, and where the conventional voltage ratio measurement schemes are not suitable. Also we are interested in having the corrective information immediately available in usable form, and to know the direction of the error.

In my voltage ratio measurement scheme, I make use of a voltage $V_1$ which has a fixed proportion with respect to $V$ but shifted in phase therefrom by 90 degrees. This $V_1$ voltage is obtained by connecting a circuit containing a resistance 18 and a condenser 19 across the source 13 so that the voltage $V_1$ is obtained across the condenser. $V_1$ is made considerably smaller than $V$ so as to be more readily compared with small values of $V_2$. Then voltages $V_1$ and $V_2$ are added vectorially and the vector resultant amplified by an amplifier 20. The amplifier may have one or more amplifying stages and the design need only maintain the time voltage resultant goes through zero. It is noted that condenser 19 and winding 15 which produce the voltages $V_1$ and $V_2$ are connected in series between the cathode and grid of amplifier 20. The amplified vector resultant of $V_1$ and $V_2$ is used to control the cyclic firing time of a thyratron tube 21. The output circuit of tube 20 is connected to the grid of thyratron 21 by a grid leak circuit including condenser 22 and resistance 23. The plate circuit of thyratron 21 is supplied from a condenser 24 which is charged on the half-cycle when the grid of 21 is negative through a rectifier 25 and transformer 26 from the supply voltage $V$.

In Fig. 2 let curve $V_1$ represent the voltage across condenser 19 and curve $V_2$ the voltage produced by winding 15. Then curve $V_r$ represents the vector summation. Assume that tube 21 is fired when its grid goes positive. Then, under the conditions assumed, tube 21 will be fired once each cycle at time $t_1$, at which time condenser 24 discharges rapidly. It is evident that if voltage $V_2$ is zero, the tube 21 will fire earlier at time $t_2$.

Now assume that voltage $V_2$ reverses 180 degrees and has a smaller value than in Fig. 2; we obtain the curves of Fig. 3. With the reversed phase relation of $V_2$ tube 21 will fire at a still earlier time $t_3$. Hence, it is seen that the time of firing of tube 21 during a cycle may be considered as a measure of $V_1/V_2$ and may be either plus or minus with respect to $t_2$ and since both $V_1$ and $V_2$ are proportional to $V$, the time of firing of tube 21 during a cycle represents a measurement of the voltage ratio $V/V_2$; and in the application described represents likewise a measurement of the error, if any, and shows the direction of the error of the angular elevation of gun 10 as compared to the directing device 11.

At 27 is a step-up transformer with its primary in the output circuit of tube 21, and with a recording spark gap in its secondary circuit across which a high voltage spark sufficient to puncture a chart is produced each time tube 21 fires. The spark gap circuit includes as one of the spark electrodes a pointer arm 28 driven by a synchronous motor 29 supplied from the source of voltage $V$ in a continuous path across a record sheet 31. The other spark gap electrode is a metal platen 30 between which and the pointer 28 the recording chart 31 is moved by a suitable chart driving device 32. If the motor 29 drives the pointer at the rate of one revolution per cycle and the pointer is arranged to be over the platen during the positive half-cycle of the resultant voltage ($V_r=V_1+V_2$), a record will be made of the phase-angle position of such resultant voltage. Thus, in Fig. 4 the dotted line record 33 indicates the nature of the record which will be produced where the ratio $V/V_2$ varies between positive and negative values.

When $V_2$ is zero the angular position of pointer 28 is adjusted so that the sparks occur when pointer 28 is over the central line 34 of the chart, and makes a record such as the point at $33a$ at cycle time $t_2$, Figs. 2 and 3. Assuming the pointer 28 to rotate clockwise or downward across chart 31 in Fig. 4, and the conditions are represented as in Fig. 2, the records below the center line will correspond to different values of $V_1/+V_2$ and point $33b$ may represent the cycle time $t_1$ of Fig. 2. When the conditions are as represented in Fig. 3, with $V_2$ reversed 180 degrees, the records will be above the line 34 and correspond to $V_1/-V_2$. Point $33c$ then represents the cycle time $t_3$, Fig. 3. The vector diagrams for the three records $33a$, $33b$, and $33c$ are shown in their proper relation in Fig. 5. Record $33b$ corresponds to $$\frac{V_1}{V_2}=1$$

Record $33c$ corresponds to $$\frac{V_1}{-V_2}=-2$$

Within practicable limits, $V_1$ may be any desired part of $V$, depending upon the values of 18 and 19, Fig. 1. Thus, if $V_1=\frac{1}{10}V$, record $33b$ corresponds to $$\frac{V}{V_2}=10$$

and record $33c$ corresponds to $$\frac{V}{-V_2}=-20$$

The measurements and records are independent of normal voltage variations of the source $V$ because $V$, $V_1$, $V_2$, and $V_r$ will all increase and decrease in the same proportion with variations in $V$. It is apparent that similar results will be obtained if the stylus 28 is driven synchronously with the $V_r$ voltage and the recording spark is discharged synchronously with the $V$ voltage.

In the application of the invention described, the record, Fig. 4, given immediate information as to how closely the gun elevation follows the director instrument 11 and whether the gun elevation is too high or too low, and the magnitude of the error. It may serve to indicate how good an automatic control functions if the control between instrument 11 and the gun is automatic. It may serve to show the elevation accuracy of a gunman's aim if the gun is handled or controlled manually from the indication of instrument 11. As a matter of fact, the gunman may use instrument 11 as a rough indication and the record 31 as a fine indication of the elevated position of his gun at any instant, because the record produced at 31 is that of the gun elevation error, if any, at the time the record is produced, and is immediately available and may have any amplification factor desired. For instance, the record $33c$, Fig. 4, may represent a gun elevation angle error of five minutes low.

The record produced is of a permanent nature, and may be referred to immediately for correcting gunnery performance during a battle, or may be subsequently studied for the purpose of instruction, testing, making adjustments, etc.

The nature of the apparatus is such that it can readily be adapted for producing such records at one or more points remote from the gun or other device under investigation, and records of both gun elevation and azimuth accuracy, for example, may conveniently be produced on the same record sheet as represented in Fig. 6.

In Fig. 1 either or both of the stator windings 14 and 16 may be rotatively adjusted to introduce range correcting angles, for example, various angular measurements may be added or subtracted between the $V$ and $V_2$ voltages and the ratio of the entering voltage $V$ with respect to the final voltage $V_2$ determined and recorded, as above described. If the transmitter 12—14 be locked or held in a fixed position, the V voltage is, in effect, applied directly to the terminals of the device 15—16 and the latter becomes a transmitter of the angular position of gun 10, and the angular movement is then recorded. It follows from this that for this purpose the device 12—14 may be eliminated entirely and the V voltage fed directly to the stator 16, using two of its three terminals as a common terminal for one of the voltage connections. It may be stated that while three phase windings are shown at 14 and 16, and they may be connected either in delta or in star, the current which flows in such windings and in the interconnections between them is a single phase current and not a three phase current.

It is observed that the recorder records the phase relation between the V and $V_r$ voltages and can be used to record the phase relation between any two single phase voltages of the same frequency. For example, if V is in phase with the line voltage and $V_r$ is in phase with the line current of a power circuit, the apparatus would record power factor.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a voltage ratio measuring and recording system, an induction device having relatively rotary primary and secondary windings, means for supplying the primary winding with an alternating current excitation of voltage V, said windings having a range of relative rotation over which a single phase voltage $V_2$ is induced in the secondary winding varying through zero value and reversing in phase relation with respect to the primary voltage V, means for obtaining a $V_1$ voltage proportional to the V voltage and 90 degrees out of phase therewith, means for vectorially combining the $V_1$ and $V_2$ voltages to produce a resultant voltage $V_r$, means for moving a record sheet, a stylus for recording on such record sheet, a synchronous motor for moving said stylus across such record sheet in a predetermined phase relation and synchronously with the V voltage, an electronic switch controlled by the $V_r$ voltage for causing said stylus to produce instantaneous records on such record sheet in a predetermined phase relation and synchronously with the $V_r$ voltage whereby the position of said records will indicate the value and phase relation of the $V_2$ voltage relative to the V voltage.

2. Voltage ratio measuring and recording apparatus comprising a pair of induction transformer devices each having single phase windings and a three phase winding, means connecting the three phase windings in parallel, a source of alternating current voltage V energizing one single phase winding, the windings on said devices being relatively rotatable and said devices having a reference relatively rotatable relationship where the voltage induced in the other single phase winding is zero whereby departures from said reference rotary relationship causes a voltage $V_2$ to be induced in said other single phase winding of a magnitude proportional to the departure from the reference rotary relationship and which is in phase or 180 degrees out of phase with the V voltage, means for deriving a voltage $V_1$ proportional but 90 degrees out of phase with the V voltage, means for vectorially combining the $V_1$ and $V_2$ voltages to produce a resultant voltage $V_r$, means for moving a record sheet, a stylus which is moved across such record sheet in synchronous relation with the V voltage, and means controlled by the $V_r$ voltage for causing said stylus to produce instantaneous records on such record sheet in synchronous relation with the $V_r$ voltage.

3. Apparatus for continuously recording variations in the ratio between two single phase voltages V and $V_2$ of the same frequency which are either in phase or 180 degrees out of phase and their in or out-of-phase relationship comprising means for producing a voltage $V_1$ which is proportional to and 90 degrees out of phase with the V voltage, a circuit for vectorially combining the $V_1$ and $V_2$ voltages to obtain a vector resultant voltage $V_r$, means for supporting and moving a record sheet, recording means moving in a continuous path across the record sheet, and means for recording the position of said recording means on the record sheet once each cycle, one of said last mentioned means being operated in synchronism with the V voltage and the other being operated in synchronism with the $V_r$ voltage.

4. Apparatus for measuring and recording the ratio between two single phase voltages V and $V_2$ of the same frequency having an inphase or 180 degree out-of-phase relation, comprising means for obtaining a voltage $V_1$ proportional to but 90 degrees out of phase with the V voltage, a circuit for combining the $V_1$ and $V_2$ voltages to produce a vector resultant voltage $V_r$, recording apparatus including means for moving a record sheet, a recording means which is moved in a continuous path transversely of such record sheet, and means for causing said recording means to produce instantaneous records on such record sheet once each cycle, said two last mentioned means being controlled one in synchronism with the V voltage and the other in synchronism with the $V_r$ voltage such that the transverse positions of the instantaneous records on the record sheet are a measurement of the ratio of the voltages V and $V_2$ at the instant when made and their phase relationship.

5. In a system for recording alternating current voltage relations on a current sensitive record sheet, comprising means for moving such a record sheet, a recording member which is moved in a continuous path passing adjacent to and across the path of movement of such record sheet in synchronous relation with one of the alternating current voltages V under investigation, and means for causing a record sheet penetrating electric discharge from said recording member once each cycle of the V voltage at a time in such cycle depending upon the phase relationship between the V voltage and another alternating current voltage $V_r$ of the same frequency as V, said apparatus being adjusted to cause the electric discharge to occur at a definite recording point in its continuous path when said voltages have a predetermined phase relationship.

THEODORE A. RICH.

REFERENCES CITED

The following references are of record in the file of this patent:

UNITED STATES PATENTS

| Number | Name | Date |
|---|---|---|
| 2,223,840 | Wolff | Dec. 13, 1940 |